(12) United States Patent
Shen

(10) Patent No.: US 11,405,167 B2
(45) Date of Patent: Aug. 2, 2022

(54) BWP FREQUENCY HOPPING CONFIGURATION METHOD, NETWORK DEVICE AND TERMINAL

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 69 days.

(21) Appl. No.: 16/922,980

(22) Filed: Jul. 7, 2020

(65) Prior Publication Data
US 2020/0336269 A1    Oct. 22, 2020

Related U.S. Application Data

(63) Continuation of application No. PCT/CN2018/071932, filed on Jan. 9, 2018.

(51) Int. Cl.
*H04L 5/00* (2006.01)
*H04B 1/713* (2011.01)
*H04W 72/04* (2009.01)

(52) U.S. Cl.
CPC .......... *H04L 5/0092* (2013.01); *H04B 1/713* (2013.01); *H04L 5/0098* (2013.01); *H04W 72/042* (2013.01); *H04W 72/0413* (2013.01); *H04W 72/0453* (2013.01)

(58) Field of Classification Search
CPC ..... H04L 5/0092; H04L 5/0098; H04L 5/001; H04L 5/0044; H04L 5/0053; H04L 5/0094; H04L 5/0012; H04B 1/713; H04W 72/0413; H04W 72/042; H04W 72/0453; H04W 72/04
See application file for complete search history.

(56) References Cited

U.S. PATENT DOCUMENTS

| 2011/0268080 A1 | 11/2011 | Luo et al. |
| 2012/0120888 A1 | 5/2012 | Miao et al. |
| 2017/0250787 A1 | 8/2017 | Geirhofer et al. |

(Continued)

FOREIGN PATENT DOCUMENTS

| CN | 102668673 A | 9/2012 |
| EP | 3709706 A1 | 9/2020 |

(Continued)

OTHER PUBLICATIONS

3GPP TSG RAN WG1 Meeting #92—Athens, Greece, Feb. 26-Mar. 2, 2018—R1-180xxxx—MCC Support, Draft Report of 3GPP TSG RAN WG1 #91 v0.2.0 (Reno, USA, Nov. 27-Dec. 1, 2017) (207 pages).

(Continued)

*Primary Examiner* — Brian T O Connor
(74) *Attorney, Agent, or Firm* — Perkins Coie LLP

(57) ABSTRACT

Provided in the present disclosure is a BWP frequency hopping configuration method, a network device and a terminal. The method includes: sending, by a network device, first configuration information of a transmission physical channel to a terminal, wherein the first configuration information is used for indicating at least one frequency domain offset respectively configured for each BWP in at least one BWP.

20 Claims, 4 Drawing Sheets

(56) References Cited

U.S. PATENT DOCUMENTS

| | | | |
|---|---|---|---|
| 2019/0215809 A1* | 7/2019 | Yang | H04L 25/0204 |
| 2020/0259521 A1* | 8/2020 | Zhao | H04B 1/7143 |
| 2020/0314845 A1* | 10/2020 | Miao | H04L 5/0044 |
| 2020/0389895 A1* | 12/2020 | Shi | H04L 5/0053 |
| 2021/0068085 A1* | 3/2021 | Chen | H04B 7/0891 |

FOREIGN PATENT DOCUMENTS

| | | |
|---|---|---|
| EP | 3713330 A1 | 9/2020 |
| WO | 2016122782 A1 | 8/2016 |

OTHER PUBLICATIONS

3GPP TSG RAN WG1 Meeting 91—R1-1719796—Reno, USA, Nov. 27-Dec. 1, 2017—vivo, On UL data transmission procedure (12 pages).

Supplementary European Search Report dated Nov. 12, 2020 of European Patent Application No. 18900312.2 (10 pages).

IPA, First Examiner's Report for Canadian Patent Application No. 3087852, dated Jul. 29, 2021. 4 pages.

IPI, Examination Report for Indian Patent Application No. 202017028495, dated Jun. 24, 2021. 5 pages with English translation.

Guangdong Oppo Mobile Telecom. "Resource Allocation for PUCCH." 3GPP TSG RAN WGI Meeting NR#3, RI-1715689., Sep. 18, 2017 (Sep. 18, 2017), sections 1-4.

Intel Corporation. "Remaining Details of UL Data Transmission Procedures in NR." 3GPP TSG RAN WGI Meeting 91, RI-1720097, Nov. 22, 2017 (Nov. 22, 2017), pp. 2-5, section 2.

International Search Report dated Sep. 25, 2018 of PCT/CN2018/071932 (6 pages).

NEC. "Frequency Hopping Schemes for NR UL PUSCH." 3GPP TSG RAN WGI Meeting 91, RI-1720900, Nov. 18, 2017 (Nov. 18, 2017), pp. 2-6, sections 3-5.

OPPO. "Resource Allocation for PUCCH." 3GPP TSG RAN WGI Meeting 91, RI-1719971., Nov. 18, 2017 (Nov. 18, 2017), sections 2 and 4.

Panasonic. "Frequency-hopping Details of Long-PUCCH." 3GPP TSG RAN WGI Meeting 91, RI-1720448., Nov. 17, 2017 (Nov. 17, 2017), entire document.

Examination Report No. 1 for Australian Application No. 2018402038 dated Jan. 31, 2022. 4 pages.

MediaTek Inc. "Summary of Bandwidth Part Operation" R1-1721504; 3GPP TSG RAN WG1 Meeting 91; Reno, USA, Nov. 27, Dec. 1, 2017. 14 pages.

NEC "Missing details of the Frequency hopping for UL NR" R1-1801696; 3GPP TSG RAN WG1 Meeting #92; Athens, Greece, Feb. 26-Mar. 2, 2018. 3 pages.

Notice of Reasons for Refusal for Japanese Application No. 2020-537576 dated Dec. 10, 2021. 13 pages with English translation.

Office Action for Taiwanese Application No. 108100710 dated Feb. 9, 2022. 8 pages with English translation.

Extended European Search Report for the European application No. 21218030.1, dated Mar. 7, 2022. 10 pages.

Notice of Acceptance of the Australian application No. 2018402038, dated May 18, 2022. 3 pages.

\* cited by examiner

A network device sends first configuration information of a transmission physical channel to a terminal, the first configuration information is used for indicating at least one frequency domain offset configured for each BWP in at least one BWP. ~101

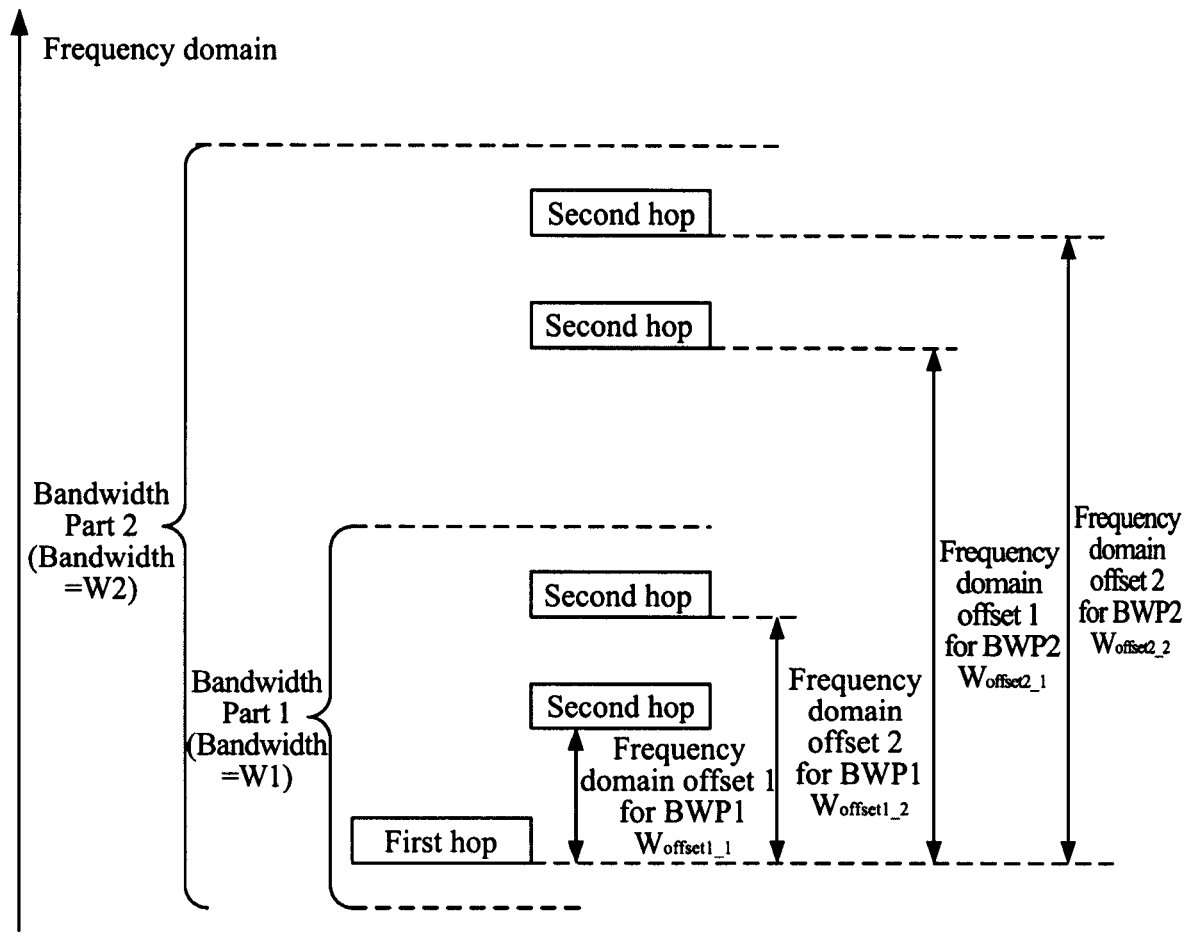

FIG. 1C

| A terminal receives first configuration information of a transmission physical channel sent by a network device, the first configuration information is used for indicating at least one frequency domain offset configured for each BWP in at least one BWP. | 201 |

| The terminal determines the at least one frequency domain offset of each BWP according to the first configuration information. | 202 |

FIG. 2A

BWP FREQUENCY HOPPING CONFIGURATION METHOD, NETWORK DEVICE AND TERMINAL

CROSS-REFERENCE TO RELATED APPLICATION

This application is a continuation application of International Application No. PCT/CN2018/071932, filed on Jan. 9, 2018, the entire content of which is hereby incorporated by reference.

TECHNICAL FIELD

The present disclosure relates to wireless access technology, in particular to a method for frequency hopping configuration of Bandwidth Part (BWP), a network device and a terminal.

BACKGROUND

In a New Radio (NR) system such as a 5G application scenario, a physical channel may adopt frequency hopping technology to obtain a frequency selective gain and improve transmission performance of the physical channel. After a concept of Bandwidth Part (BWP) is introduced, since a terminal may be configured with multiple BWPs, a frequency domain offset of a physical channel may be uniformly configured according to the BWP with the minimum bandwidth to realize the frequency hopping of the physical channel in each BWP.

However, because the frequency domain offset of the physical channel is uniformly configured according to the BWP with the minimum bandwidth, a larger bandwidth of the BWP with the larger bandwidth may not be fully utilized to realize the frequency hopping with a larger amplitude, thus limiting the frequency selective gain and causing a reduction of transmission performance of the physical channel.

SUMMARY

A method for frequency hopping configuration of BWP, a network device, and a terminal are provided in multiple aspects of the present disclosure.

In one aspect of the present disclosure, there is provided a method for frequency hopping configuration of BWP, including:

sending, by a network device, first configuration information of a transmission physical channel to a terminal, wherein the first configuration information is used for indicating at least one frequency domain offset respectively configured for each BWP in at least one BWP.

In another aspect of the present disclosure, there is provided another method for frequency hopping configuration of BWP, including:

receiving, by a terminal, first configuration information of a transmission physical channel sent by a network device, wherein the first configuration information is used for indicating at least one frequency domain offset respectively configured for each BWP in at least one BWP;

determining, by the terminal, the at least one frequency domain offset for each BWP according to the first configuration information.

In another aspect of the present disclosure, there is provided a network device including:

a sending unit, configured to send first configuration information of a transmission physical channel to a terminal, wherein the first configuration information is used for indicating at least one frequency domain offset respectively configured for each BWP in at least one BWP.

In another aspect of the present disclosure, a terminal is provided, which includes:

a receiving unit, configured to receive first configuration information of a transmission physical channel sent by a network device, wherein the first configuration information is used for indicating at least one frequency domain offset respectively configured for each BWP in at least one BWP; and a determination unit, configured to determine the at least one frequency domain offset for each BWP according to the first configuration information.

BRIEF DESCRIPTION OF DRAWINGS

In order to explain the technical solution of implementations of the present disclosure more clearly, accompanying drawings that need to be used in the description of the implementations or the prior art will be briefly introduced below. It is apparent that, the accompanying drawings in the following description are only some implementations of the present disclosure. For those ordinary skilled in the art, other drawings may be obtained according to those drawings without paying an inventive effort.

FIG. 1C is a schematic diagram of another frequency domain offset configuration provided by the implementation according to FIG. 1A.

FIG. 2A is a schematic flowchart of another method for frequency hopping configuration of BWP provided by another implementation of the present disclosure.

DETAILED DESCRIPTION

In order to make the purpose, technical solutions and advantages of implementations of the present disclosure more clearly, the technical solutions in the implementations of the present disclosure will be described clearly and completely in the following with reference to the drawings in the implementations of the present disclosure. It is apparent that, the described implementations are parts, but not all, of the implementations of the present disclosure. Based on the implementations of the present disclosure, all other implementations obtained by a person of ordinary skill in the art without paying an inventive effort are within the protection scope of the present disclosure.

The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

The main idea of the present disclosure is to configure different frequency domain offset sets for different BWPs and make full use of the bandwidth of each BWP, so that the frequency hopping offset can be maximized on the basis of not exceeding the bandwidth of the BWP to obtain a greater frequency selective gain, thereby improving the transmission performance of a physical channel.

Figures 1A, 1B:
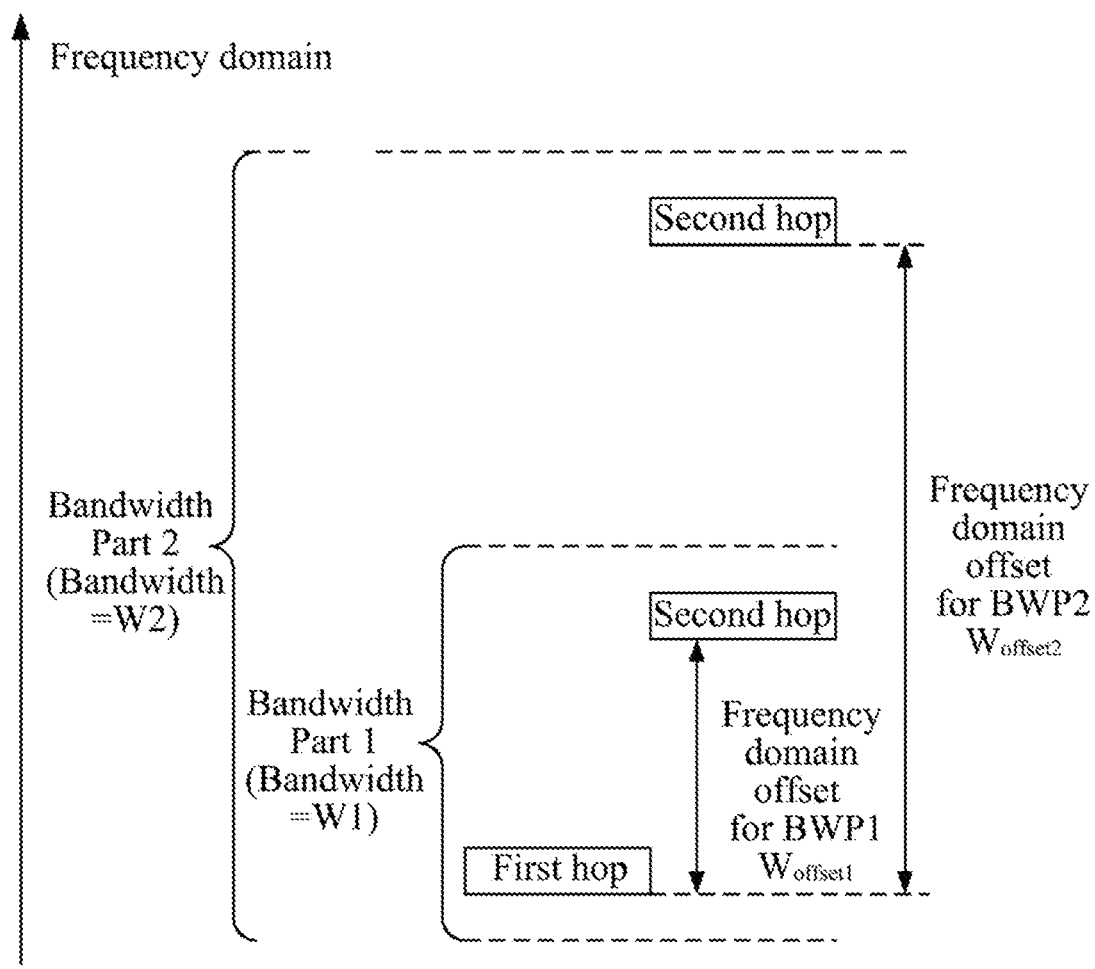
FIG. 1A is a schematic flowchart of a method for frequency hopping configuration of BWP provided by an implementation of the present disclosure.
FIG. 1B is a schematic diagram of a frequency domain offset configuration provided by the implementation according to FIG. 1A.

FIG. 1A is a flow chart of a method for frequency hopping configuration of BWP provided by an implementation of the present disclosure, as shown in FIG. 1A.

In 101, a network device sends first configuration information of a transmission physical channel to a terminal, the first configuration information is used for indicating at least one frequency domain offset configured for each BWP in at least one BWP.

The frequency domain offset refers to a frequency domain offset between two hops of frequency hopping, and may be expressed by the number of Resource Blocks (RB).

Optionally, in a possible implementation mode of this implementation, the physical channel may include, but is not limited to, at least one of a Physical Uplink Shared Channel (PUSCH), a Physical Downlink Shared Channel (PDSCH), a Physical Uplink Control Channel (PUCCH), and a Physical Downlink Control Channel (PDCCH).

Optionally, in a possible implementation mode of this implementation, in 101, the network device may specifically send the first configuration information of the transmission physical channel to the terminal through high-level signaling or a system broadcast message.

For example, the high-level signaling may be Radio Resource Control (RRC) signaling, specifically the first configuration information may be carried by an Information Element (IE) in the RRC signaling. The RRC signaling may be RRC signaling in the prior art, for example, RRC CONNECTION RECONFIGURATION message and the like, which is not restricted in this implementation. The first configuration information is carried by expanding the IE of the existing RRC signaling, or the RRC signaling may be different from the existing RRC signaling in the prior art.

For another example, the first configuration information may be specifically carried by using a reserved bit in an existing master information block (MIB) or system information block (SIB) in the system broadcast message, or the first configuration information may be carried by adding a new SIB.

In the present disclosure, the network device may further send second configuration information to the terminal for indicating to configure the at least one BWP. After receiving the second configuration information, the terminal may determine a position of each BWP in the at least one BWP.

Specifically, the network device may send the second configuration information to the terminal through high-level signaling or a system broadcast message.

For example, the high-level signaling may be Radio Resource Control (RRC) signaling, specifically the second configuration information may be carried by an Information Element (IE) in the RRC signaling. The RRC signaling may be RRC signaling in the prior art, for example, RRC CONNECTION RECONFIGURATION message and the like, which is not restricted in this implementation. The second configuration information is carried by expanding the IE of the existing RRC signaling, or the RRC signaling may be different from the existing RRC signaling in the prior art.

For another example, the second configuration information may be specifically carried by using a reserved bit in an existing master information block (MIB) or system information block (SIB) in the system broadcast message, or the second configuration information may be carried by adding a new SIB.

Optionally, in a possible implementation mode of this implementation, after 101, the network device may further send first control information to the terminal, the first control information is used for indicating an activated BWP in the at least one BWP. Thus, after receiving the first control information, the terminal may determine at least one frequency domain offset for the activated BWP.

Specifically, the network device may send the first control information to the terminal through Downlink Control Information (DCI) or high-level signaling.

For example, the high-level signaling may be a media access control (MAC) control element (CE) message, and the first configuration information may be specifically carried by adding a new MAC CE message.

Optionally, in a possible implementation mode of this implementation, after 101, the network device may further send second control information to the terminal, the second control information is used for indicating, in the at least one frequency domain offset, a frequency domain offset used. In this way, after receiving the second control information, the terminal may determine the frequency domain offset used for the activated BWP.

Specifically, the network device may send the second control information to the terminal through Downlink Control Information (DCI) or high-level signaling.

For example, the high-level signaling may be a media access control (MAC) control element (CE) message, and the second configuration information may be specifically carried by adding a new MAC CE message.

Optionally, in a possible implementation mode of this implementation, after 101, the network device may further send third control information to the terminal, the third control information is used for indicating a position of the first frequency domain resource for transmitting the physical channel in the activated BWP.

Specifically, the network device may send the third control information to the terminal through Downlink Control Information (DCI) or high-level signaling.

For example, the high-level signaling may be a media access control (MAC) control element (CE) message, and the third configuration information may be specifically carried by adding a new MAC CE message.

Optionally, in a possible implementation mode of this implementation, after 101, the network device may further transmit the physical channel with the terminal on the first frequency domain resource for transmitting the physical channel and a second frequency domain resource for transmitting the physical channel, and a position of the second frequency domain resource in the activated BWP is determined by using a formula $R2=(R1+W_{offset})$ mod W. Wherein, R2 is the position of the second frequency domain resource in the activated BWP; R1 is the position of the first frequency domain resource in the activated BWP; $W_{offset}$ is the frequency domain offset used; and W is the bandwidth for the activated BWP.

It should be noted that the network device may also send at least one of the first control information, the second control information and the third control information to the terminal without high-level signaling or a system broadcast message. In this way, the terminal may obtain the content indicated by at least one of the first control information, the second control information and the third control information according to the pre-configuration, for example, a protocol agreement.

In order to make the method provided by an implementation of the present disclosure clearer, configuring one frequency domain offset and configuring two different frequency domain offset sets for different BWPs are taken as examples respectively in the following.

FIG. 1B is a diagram of a frequency domain offset configuration provided by the implementation according to FIG. 1A. As shown in FIG. 1B, it is assumed that two BWPs, namely BWP1 and BWP2, are configured for the terminal. The bandwidth of BWP1 is W1, the bandwidth of BWP2 is W2, the frequency domain offset $W_{offset1}$ is configured for BWP1, and the frequency domain offset $W_{offset2}$ is configured for BWP2.

If BWP1 is activated, the terminal determines the position of the second frequency domain resource, i.e. the frequency domain position of the second hop, $R2=(R1+W_{offset1})$ mod W1, according to $W_{offset1}$ and the position of the first frequency domain resource, i.e. the frequency domain position R1 of the first hop.

If BWP2 is activated, the terminal determines the frequency domain position of the second hop, $R2=(R1+W_{offset2})$ mod W2, according to $W_{offset2}$ and the frequency domain position R1 of the first hop.

FIG. 1C is another frequency domain offset configuration diagram provided by the implementation according to FIG. 1A. As shown in FIG. 1C, it is assumed that two BWPs, namely BWP1 and BWP2, are configured for the terminal, the bandwidth of BWP1 is W1, and the bandwidth of BWP2 is W2. Two frequency domain offsets, namely $W_{offset1\_1}$ and $W_{offset1\_2}$, are configured for BWP1, and two frequency domain offsets, namely $W_{offset2\_1}$ and $W_{offset2\_2}$, are configured for BWP2.

If BWP1 is activated and the base station indicates the terminal to adopt the first frequency domain offset $W_{offset1\_1}$, the terminal determines the frequency domain position of the second hop, $R2=(R1\ W_{offset1\_1})$ mod W1, according to $W_{offset1\_1}$ and the frequency domain position R1 of the first hop.

If BWP1 is activated and the base station indicates the terminal to adopt the second frequency domain offset $W_{offset1\_2}$, the terminal determines the frequency domain position of the second hop, $R2=(R1+W_{offset1\_2})$ mod W1, according to $W_{offset1\_2}$ and the frequency domain position R1 of the first hop.

If BWP2 is activated and the base station indicates the terminal to adopt the first frequency domain offset $W_{offset2\_1}$, the terminal determines the frequency domain position of the second hop, $R2=(R1+W_{offset2\_1})$ mod W1, according to $W_{offset2\_1}$ and the frequency domain position R1 of the first hop.

If BWP2 is activated and the base station indicates the terminal to adopt the second frequency domain offset $W_{offset2\_2}$, the terminal determines the frequency domain position of the second hop, $R2=(R1+W_{offset2\_2})$ mod W1, according to $W_{offset2\_2}$ and the frequency domain position R1 of the first hop.

In this implementation, the first configuration information of a transmission physical channel is sent to a terminal through a network device, the first configuration information is used for indicating at least one frequency domain offset configured for each BWP in at least one BWP respectively, so that different frequency domain offset sets are configured for different BWPs, and the bandwidth of each BWP is fully utilized, thus the frequency hopping offset can be maximized on the basis of not exceeding the bandwidth of the BWP to obtain a greater frequency selective gain, thereby improving the transmission performance of the physical channel.

FIG. 2A is a flowchart of another method for frequency hopping configuration of BWP provided by another implementation of the present disclosure, as shown in FIG. 2A.

In 201, a terminal receives first configuration information of a transmission physical channel sent by a network device, the first configuration information is used for indicating at least one frequency domain offset configured for each BWP in at least one BWP.

In 202, the terminal determines the at least one frequency domain offset for each BWP according to the first configuration information.

The frequency domain offset refers to a frequency domain offset between two hops of frequency hopping, and may be expressed by the number of Resource Blocks (RB).

Optionally, in a possible implementation mode of this implementation, the physical channel may include, but is not limited to, at least one of a Physical Uplink Shared Channel (PUSCH), a Physical Downlink Shared Channel (PDSCH), a Physical Uplink Control Channel (PUCCH), and a Physical Downlink Control Channel (PDCCH).

Optionally, in a possible implementation mode of this implementation, in 201, the terminal may specifically receive the first configuration information sent by the network device through high-level signaling or a system broadcast message.

For example, the high-level signaling may be Radio Resource Control (RRC) signaling, specifically the first configuration information may be carried by an Information Element (IE) in the RRC signaling. The RRC signaling may be RRC signaling in the prior art, for example, RRC CONNECTION RECONFIGURATION message and the like, which is not restricted in this implementation. The first configuration information is carried by expanding the IE of the existing RRC signaling, or the RRC signaling may be different from the existing RRC signaling in the prior art.

For another example, the first configuration information may be specifically carried by using a reserved bit in an existing master information block (MIB) or system information block (SIB) in the system broadcast message, or the first configuration information may be carried by adding a new SIB.

In the present disclosure, the terminal may further receive the second configuration information sent by the network device, for indicating to configure the at least one BWP, and further, the position of each BWP in the at least one BWP may be determined.

Specifically, the terminal may specifically receive the second configuration information sent by the network device through a high-level signaling or a system broadcast message.

For example, the high-level signaling may be Radio Resource Control (RRC) signaling, specifically the second configuration information may be carried by an Information Element (IE) in the RRC signaling. The RRC signaling may be RRC signaling in the prior art, for example, RRC CONNECTION RECONFIGURATION message and the like, which is not restricted in this implementation. The second configuration information is carried by expanding the IE of the existing RRC signaling, or the RRC signaling may be different from the existing RRC signaling in the prior art.

For another example, the second configuration information may be specifically carried by using a reserved bit in an existing master information block (MIB) or system information block (SIB) in the system broadcast message, or the second configuration information may be carried by adding a new SIB.

Figure 2B:
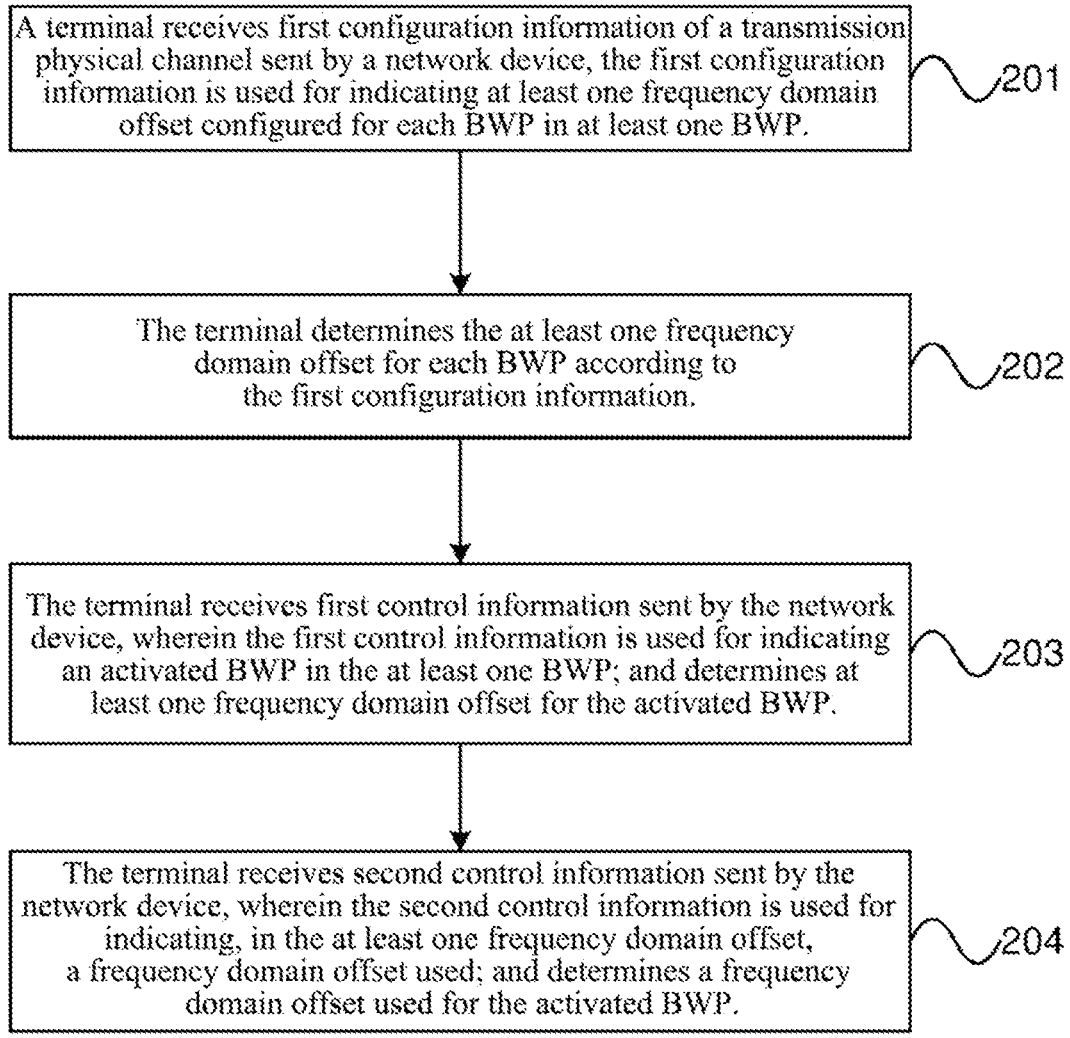
FIG. 2B is a schematic flowchart of another method for frequency hopping configuration of BWP provided by another implementation of the present disclosure.

Optionally, in a possible implementation mode of this implementation, as shown in FIG. 2B, after 201, 203 may be further performed, the terminal receives first control information sent by the network device, the first control information is used for indicating an activated BWP in the at least one BWP. In this way, the terminal may determine at least one frequency domain offset for the activated BWP.

Specifically, the terminal may specifically receive the first control information sent by the network device through Downlink Control Information (DCI) or high-level signaling.

For example, the high-level signaling may be a media access control (MAC) control element (CE) message, and the first configuration information may also be specifically carried by adding a new MAC CE message.

Optionally, in a possible implementation mode of this implementation, as shown in FIG. 2B, after 201, 204 may be further performed, the terminal receives second control information sent by the network device, the second control information is for indicating, in the at least one frequency domain offset, a frequency domain offset used. In this way, the terminal may determine a frequency domain offset used for the activated BWP.

Specifically, the terminal may specifically receive the second control information sent by the network device through downlink control information or high-level signaling.

For example, the high-level signaling may be a media access control (MAC) control element (CE) message, and the second configuration information may also be specifically carried by adding a new MAC CE message.

Optionally, in a possible implementation mode of this implementation, after 201, the terminal may further receive third control information sent by the network device, the third control information is used for indicating the position of the first frequency domain resource for transmitting the physical channel in the activated BWP. In this way, the terminal may determine the position of the first frequency domain resource for transmitting the physical channel in the activated BWP.

Specifically, the terminal may specifically receive the third control information sent by the network device through downlink control information or high-level signaling.

For example, the high-level signaling may be a media access control (MAC) control element (CE) message, and the third configuration information may also be specifically carried by adding a new MAC CE message.

Optionally, in a possible implementation mode of this implementation, after 201, the terminal may further determine the position of the second frequency domain resource for transmitting the physical channel in the activated BWP by using the formula $R2=(R1+W_{offset})\mod W$ according to the bandwidth for the activated BWP, the frequency domain offset used and the position of the first frequency domain resource for transmitting the physical channel in the activated BWP. Wherein, R2 is the position of the second frequency domain resource in the activated BWP; R1 is the position of the first frequency domain resource in the activated BWP; $W_{offset}$ is the frequency domain offset used; W is the bandwidth for the activated BWP. Furthermore, the terminal may transmit the physical channel with the network device on the first frequency domain resource and the second frequency domain resource.

It should be noted that the network device may also send at least one of the first control information, the second control information and the third control information to the terminal without high-level signaling or a system broadcast message. In this way, the terminal may obtain the content indicated by at least one of the first control information, the second control information and the third control information according to the pre-configuration, for example, a protocol agreement.

In order to make the method provided by the implementation of the present disclosure clearer, similarly, relevant contents in the implementations according to FIG. 1A to FIG. 1C may also be referred to, and they will not be described here again.

In this implementation, a terminal receives first configuration information of a transmission physical channel sent by a network device, the first configuration information is used for indicating at least one frequency domain offset configured for each BWP in at least one BWP respectively, and the terminal further determines at least one frequency domain offset for each BWP according to the first configuration information, so that different frequency domain offset sets are configured for different BWPs, the bandwidth of each BWP is fully utilized, thus the frequency hopping offset can be maximized on the basis of not exceeding the bandwidth of the BWP, so as to obtain a greater frequency selective gain, thereby improving the transmission performance of the physical channel.

It should be noted that for sake of conciseness, the aforementioned method implementations are all expressed as a series of action combinations, but one skilled person in the art should know that the present disclosure is not limited by the described order of acts, since according to the present disclosure, some acts may be performed in other orders or simultaneously. Secondly, one skilled person in the art should also know that the implementations described in the specification are all preferred implementations, and the actions and modules involved are not necessary for the present disclosure.

In the above-mentioned implementations, the descriptions for various implementations focus differently, a part which is not described in detail in an implementation may refer to related descriptions in other implementations.

Figure 3A:
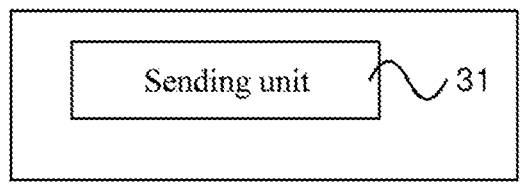
FIG. 3A is a schematic structural diagram of a network device provided by another implementation of the present disclosure.

FIG. 3A is a structural diagram of a network device provided by another implementation of the present disclosure, as shown in FIG. 3A. The network device of this implementation may include a sending unit 31, which may be configured to transmit first configuration information of a transmission physical channel to a terminal, the first configuration information is used for indicating at least one frequency domain offset configured for each BWP in at least one BWP respectively.

The frequency domain offset refers to a frequency domain offset between two hops of frequency hopping, and may be expressed by the number of Resource Blocks (RB).

Optionally, in a possible implementation mode of this implementation, the physical channel may include, but is not limited to, at least one of a Physical Uplink Shared Channel (PUSCH), a Physical Downlink Shared Channel (PDSCH), a Physical Uplink Control Channel (PUCCH), and a Physical Downlink Control Channel (PDCCH).

Optionally, in a possible implementation mode of this implementation, the sending unit 31 may be specifically configured to send the first configuration information to the terminal through RRC signaling or a system broadcast message.

Optionally, in a possible implementation mode of this implementation, the sending unit 31 may be further configured to send first control information to the terminal, the first control information is used for indicating an activated BWP in the at least one BWP.

Specifically, the sending unit 31 may be specifically configured to send the first control information to the terminal through downlink control information or a media access control control element message.

Optionally, in a possible implementation mode of this implementation, the sending unit 31 may be further configured to send second control information to the terminal, the second control information is used for indicating, in the at least one frequency domain offset, a frequency domain offset used.

Specifically, the sending unit 31 may be specifically configured to send the second control information to the terminal through downlink control information or a media access control control element message.

Optionally, in a possible implementation mode of this implementation, the sending unit 31 may be further configured to send third control information to the terminal, the third control information is used for indicating a position of the first frequency domain resource for transmitting the physical channel in the activated BWP.

Specifically, the sending unit 31 may be specifically configured to send the third control information to the terminal through downlink control information or a media access control control element message.

Figure 3B:
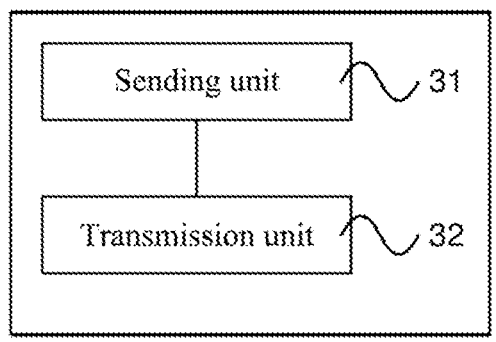
FIG. 3B is a schematic structural diagram of another network device provided by another implementation of the present disclosure.

Optionally, in a possible implementation mode of this implementation, as shown in FIG. 3B, the network device provided by this implementation may further include a transmission unit 32, which may be configured to transmit the physical channel with the terminal on the first frequency domain resource for transmitting the physical channel and a second frequency domain resource for transmitting the physical channel. The position of the second frequency domain resource in the activated BWP is determined by the formula $R2=(R1+W_{offset})\mod W$ according to the bandwidth for the activated BWP, the frequency domain offset used and the position of the first frequency domain resource for transmitting the physical channel in the activated BWP. Wherein R2 is the position of the second frequency domain resource in the activated BWP; R1 is the position of the first frequency domain resource in the activated BWP; $W_{offset}$ is the frequency domain offset used; W is the bandwidth for the activated BWP.

It should be noted that the method in the implementation according to FIG. 1A may be implemented by the network device provided in this implementation. Relevant contents in the implementation according to FIG. 1A may be referred to for detailed descriptions, which are not repeated here.

In this implementation, the sending unit sends the first configuration information of the transmission physical channel to the terminal, the first configuration information is used for indicating at least one frequency domain offset respectively configured for each BWP in the at least one BWP, so that different frequency domain offset sets are configured for different BWPs, the bandwidth of each BWP is fully utilized, thus the frequency hopping offset can be maximized on the basis of not exceeding the bandwidth of the BWP to obtain a greater frequency selective gain, thereby improving the transmission performance of the physical channel.

Figure 4A:
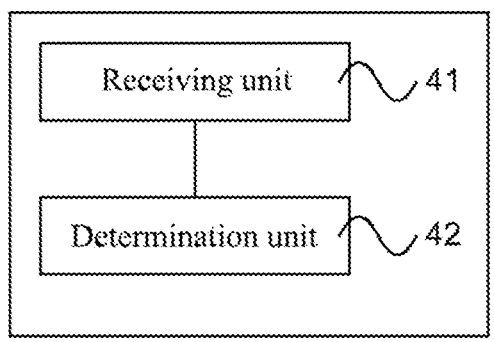
FIG. 4A is a schematic structural diagram of a terminal provided by another implementation of the present disclosure.

FIG. 4A is a structural diagram of a terminal provided by another implementation of the present disclosure, as shown in FIG. 4A. The terminal of this implementation may include a receiving unit 41 and a determination unit 42. The receiving unit 41 is configured to receive first configuration information of a transmission physical channel sent by a network device, the first configuration information is used for indicating at least one frequency domain offset configured for each BWP in at least one BWP respectively. The determining unit 42 is configured to determine the at least one frequency domain offset for each BWP according to the first configuration information.

The frequency domain offset refers to the frequency domain offset between two hops of frequency hopping, and may be expressed by the number of Resource Blocks (RB).

Optionally, in a possible implementation mode of this implementation, the physical channel may include, but is not limited to, a Physical Uplink Shared Channel (PUSCH), a Physical Downlink Shared Channel (PDSCH), a Physical Uplink Control Channel (PUCCH), and a Physical Downlink Control Channel (PDCCH).

Optionally, in a possible implementation mode of this implementation, the receiving unit 41 may be specifically configured to receive the first configuration information sent by the network device through RRC signaling or a system broadcast message.

Optionally, in a possible implementation mode of this implementation, the receiving unit 41 may be further configured to receive first control information sent by the network device, the first control information is used for indicating an activated BWP in the at least one BWP; the determination unit 42 may be further configured to determine at least one frequency domain offset for the activated BWP.

Specifically, the receiving unit 41 may be specifically configured to receive the first control information sent by the network device through downlink control information or a media access control control element message.

Optionally, in a possible implementation mode of this implementation, the receiving unit 41 may be further configured to receive second control information sent by the network device, the second control information is used for indicating, in the at least one frequency domain offset, a frequency domain offset used; the determination unit 42 may be further configured to determine a frequency domain offset used for the activated BWP.

Specifically, the receiving unit 41 may be specifically configured to receive the second control information sent by the network device through downlink control information or a media access control control element message.

Optionally, in a possible implementation mode of this implementation, the receiving unit 41 may be further configured to receive third control information sent by the network device, the third control information is used for indicating a position of the first frequency domain resource for transmitting the physical channel in the activated BWP.

Specifically, the receiving unit 41 may be specifically configured to receive the third control information sent by the network device through downlink control information or a media access control control element message.

Figure 4B:
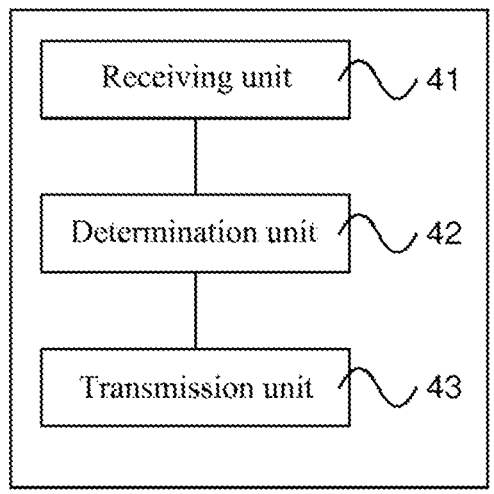
FIG. 4B is a schematic structural diagram of another terminal provided by another implementation of the present disclosure.

Optionally, in a possible implementation mode of this implementation, as shown in FIG. 4B, the terminal provided by this implementation may further include a transmission unit 43, which may be configured to determine a position of the second frequency domain resource for transmitting the physical channel in the activated BWP by using the formula $R2=(R1+W_{offset})\mod W$ according to the bandwidth for the activated BWP, the frequency domain offset used and the position of the first frequency domain resource for transmitting the physical channel in the activated BWP; wherein R2 is the position of the second frequency domain resource in the activated BWP, R1 is the position of the first frequency domain resource in the activated BWP, $W_{offset}$ is the frequency domain offset used, W is the bandwidth for the activated BWP; and transmit the physical channel with the network device on the first frequency domain resource and the second frequency domain resource.

It should be noted that the method in the implementation corresponding to FIG. 2A may be implemented by the terminal provided in the implementation. Relevant contents in the corresponding implementation of FIG. 2A may be referred to for detailed descriptions, which are not repeated here.

In this implementation, a receiving unit receives first configuration information of a transmission physical channel sent by a network device, the first configuration information is used for indicating at least one frequency domain offset respectively configured for each BWP in at least one BWP, and then the determining unit determines at least one frequency domain offset for each BWP according to the first configuration information, so that different frequency domain offset sets are configured for different BWPs, bandwidth of each BWP is fully utilized, thus the frequency hopping offset can be maximized on the basis of not exceeding the bandwidth of BWP to obtain a greater frequency selective gain, thereby improving the transmission performance of the physical channel.

Those skilled in the art may clearly understand that, for convenience and conciseness of the description, the specific working processes of the system, device and unit described above may refer to the corresponding processes in the above method implementations, which are not described here again.

In the several implementations provided by the present disclosure, it should be understood that the disclosed systems, devices and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection between apparatuses or units through some interfaces, and may be in electrical, mechanical or other forms.

The units described as separate components may or may not be physically separated, and the components shown as units may or may not be physical units, i.e., may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit. The integrated units may be implemented in the form of hardware or in the form of hardware plus software functional units.

Finally, it should be noted that the above implementations are only used to illustrate the technical solutions of the present disclosure, but not limit the present disclosure. Although the present disclosure has been described in detail with reference to the foregoing implementations, it should be understood by those skilled in the art that the technical solutions described in the foregoing implementations may be modified or some of technical features thereof may be equally substituted, and all these modifications and substitutions do not make the spirit of corresponding technical solutions depart from the spirit and scope of technical solutions of various implementations of the present disclosure.

What is claim is:

1. A method for frequency hopping configuration of Bandwidth Part (BWP), comprising:

sending, by a network device, first configuration information of a transmission physical channel to a terminal, wherein the first configuration information is used for indicating at least one frequency domain offset respectively configured for each BWP in at least one BWP; and transmitting, by the network device, the physical channel with the terminal on the first frequency domain resource for transmitting the physical channel and a second frequency domain resource for transmitting the physical channel, wherein a position of the second frequency domain resource in an activated BWP is determined by using a formula $R2=(R1+W_{offset})\mod W$ according to a bandwidth for the activated BWP, the frequency domain offset used and the position of the first frequency domain resource for transmitting the physical channel in the activated BWP; wherein R2 is the position of the second frequency domain resource in the activated BWP, R1 is the position of the first frequency domain resource in the activated BWP, $W_{offset}$ is the frequency domain offset used, W is the bandwidth for the activated BWP.

2. The method of claim 1, wherein, the physical channel comprises at least one of a physical uplink shared channel, a physical downlink shared channel, a physical uplink control channel, and a physical downlink control channel.

3. The method of claim 1, wherein, after sending, by the network device, the first configuration information of the transmission physical channel to the terminal, the method further comprises:

sending, by the network device, first control information to the terminal, wherein the first control information is used for indicating an activated BWP in the at least one BWP.

4. The method of claim 1, wherein, after sending, by the network device, the first configuration information of the transmission physical channel to the terminal, the method further comprises:

sending, by the network device, second control information to the terminal, wherein the second control information is used for indicating, in the at least one frequency domain offset, a frequency domain offset used.

5. The method of claim 1, wherein after sending, by the network device, the first configuration information of the transmission physical channel to the terminal, the method further comprises:

sending, by the network device, third control information to the terminal, wherein the third control information is used for indicating a position of a first frequency domain resource for transmitting the physical channel in an activated BWP.

6. A method for frequency hopping configuration of Bandwidth Part (BWP), comprising:
receiving, by a terminal, first configuration information of a transmission physical channel sent by a network device, wherein the first configuration information is used for indicating at least one frequency domain offset respectively configured for each BWP in at least one BWP; and
determining, by the terminal, the at least one frequency domain offset for each BWP according to the first configuration information,
wherein, after receiving, by the terminal, the first configuration information of the transmission physical channel sent by the network device, the method further comprises:
determining, by the terminal, a position of the second frequency domain resource for transmitting the physical channel in an activated BWP by using a formula $R2=(R1+W_{offset})\mod W$ according to a bandwidth for the activated BWP, the frequency domain offset used and the position of the first frequency domain resource for transmitting the physical channel in the activated BWP; wherein, R2 is the position of the second frequency domain resource in the activated BWP, R1 is the position of the first frequency domain resource in the activated BWP, $W_{offset}$ is the frequency domain offset used, W is the bandwidth for the activated BWP, and
transmitting, by the terminal, the physical channel with the network device on the first frequency domain resource and the second frequency domain resource.

7. The method of claim 6, wherein, the physical channel comprises at least one of a physical uplink shared channel, a physical downlink shared channel, a physical uplink control channel, and a physical downlink control channel.

8. The method of claim 6, wherein after receiving, by the terminal device, the first configuration information of the transmission physical channel sent by the network device, the method further comprises:
receiving, by the terminal, first control information sent by the network device, wherein the first control information is used for indicating an activated BWP in the at least one BWP; and
determining, by the terminal, at least one frequency domain offset for the activated BWP.

9. The method of claim 6, wherein, after receiving, by the terminal, the first configuration information of the transmission physical channel sent by the network device, the method further comprises:
receiving, by the terminal, second control information sent by the network device, wherein the second control information is used for indicating, in the at least one frequency domain offset, a frequency domain offset used; and
determining, by the terminal, a frequency domain offset used for an activated BWP.

10. The method of claim 6, wherein, after receiving, by the terminal, the first configuration information of the transmission physical channel sent by the network device, the method further comprises:
receiving, by the terminal, third control information sent by the network device, wherein the third control information is used for indicating a position of the first frequency domain resource for transmitting the physical channel in an activated BWP.

11. A network device, comprising: a processor and a memory storing program instructions;
wherein when the program instructions are executed by the processor, the execution causes the network device to:
obtain a first configuration information of a transmission physical channel, wherein the first configuration information is used for indicating at least one frequency domain offset respectively configured for each Bandwidth Part (BWP) in at least one BWP;
output the first configuration information of a transmission physical channel to a terminal,
wherein, the execution further causes the network device to:
output the physical channel with the terminal on the first frequency domain resource for transmitting the physical channel and a second frequency domain resource for transmitting the physical channel, wherein a position of the second frequency domain resource in an activated BWP is determined by using a formula $R2=(R1+W_{offset})\mod W$ according to a bandwidth for the activated BWP, the frequency domain offset used and the position of the first frequency domain resource for transmitting the physical channel in the activated BWP; wherein, R2 is the position of the second frequency domain resource in the activated BWP, R1 is the position of the first frequency domain resource in the activated BWP, $W_{offset}$ is the frequency domain offset used, W is the bandwidth for the activated BWP.

12. The network device of claim 11, wherein, the physical channel comprises at least one of a physical uplink shared channel, a physical downlink shared channel, a physical uplink control channel, and a physical downlink control channel.

13. The network device of claim 11, wherein, the execution further causes the network device to:
output first control information to the terminal, wherein the first control information is used for indicating an activated BWP in the at least one BWP.

14. The network device of claim 11, wherein the execution further causes the network device to:
output second control information to the terminal, wherein the second control information is used for indicating, in the at least one frequency domain offset, a frequency domain offset used.

15. The network device of claim 11, wherein, the execution further causes the network device to:
output third control information to the terminal, wherein the third control information is used for indicating a position of a first frequency domain resource for transmitting the physical channel in an activated BWP.

16. A terminal, comprising:
a processor and a memory storing program instructions;
wherein when the program instructions are executed by the processor, the execution causes the terminal to:
obtain first configuration information of a transmission physical channel sent by a network device, wherein the first configuration information is used for indicating at least one frequency domain offset respectively configured for each Bandwidth Part (BWP) in at least one BWP; and
determine the at least one frequency domain offset for each BWP according to the first configuration information, wherein, the execution further causes the terminal to
determine a position of the second frequency domain resource for transmitting the physical channel in an activated BWP by using a formula $R2=(R1+W_{offset})$ mod W according to a bandwidth for the activated BWP, the frequency domain offset used and the position of the first frequency domain resource for transmitting the physical channel in the activated BWP; wherein, R2 is the position of the second frequency domain resource in the activated BWP, R1 is the position of the first frequency domain resource in the activated BWP, $W_{offset}$ is the frequency domain offset used, W is the bandwidth for the activated BWP; and
output the physical channel with the network device on the first frequency domain resource and the second frequency domain resource.

17. The terminal of claim 16, wherein, the physical channel comprises at least one of a physical uplink shared channel, a physical downlink shared channel, a physical uplink control channel, and a physical downlink control channel.

18. The terminal of claim 16, wherein the execution further causes the terminal to
obtain first control information sent by the network device, wherein the first control information is used for indicating an activated BWP in the at least one BWP.

19. The terminal of claim 16, wherein the execution further causes the terminal to
obtain second control information sent by the network device, wherein the second control information is used for indicating, in the at least one frequency domain offset, a frequency domain offset used;
determine at least one frequency domain offset of an activated BWP.

20. The terminal of claim 16, wherein the execution further causes the terminal to
obtain third control information sent by the network device, wherein the third control information is used for indicating a position of the first frequency domain resource for transmitting the physical channel in an activated BWP;
determine a frequency domain offset used for an activated BWP.

* * * * *